United States Patent
Zhang (10) Patent No.: US 7,989,981 B2
(45) Date of Patent: Aug. 2, 2011

(54) POWER ADAPTOR AND STORAGE UNIT FOR PORTABLE DEVICES

(75) Inventor: Xiaoyang Zhang, Richardson, TX (US)

(73) Assignee: Flextronics AP, LLC, Broomfield, CO (US)

(*) Notice: Subject to any disclaimer, the term of this patent is extended or adjusted under 35 U.S.C. 154(b) by 447 days.

(21) Appl. No.: 11/701,577

(22) Filed: Feb. 1, 2007

(65) Prior Publication Data

US 2007/0190848 A1   Aug. 16, 2007

Related U.S. Application Data

(60) Provisional application No. 60/764,865, filed on Feb. 2, 2006.

(51) Int. Cl.
   *H02J 7/00* (2006.01)
   *H02J 9/00* (2006.01)

(52) U.S. Cl. .......................................................... 307/66

(58) Field of Classification Search .................. 307/66
   See application file for complete search history.

(56) References Cited

U.S. PATENT DOCUMENTS

| | | |
|---|---|---|
| 4,645,278 A | 2/1987 | Yevak, Jr. et al. ............. 339/17 T |
| 4,712,160 A | 12/1987 | Sato et al. ...................... 361/388 |
| 4,788,626 A | 11/1988 | Neidig et al. .................. 361/386 |
| 4,806,110 A | 2/1989 | Lindeman ...................... 439/108 |
| 4,893,227 A | 1/1990 | Gallios et al. .................. 363/26 |
| 4,899,256 A | 2/1990 | Sway-Tin ....................... 361/386 |
| 4,901,069 A | 2/1990 | Veneruso ....................... 340/853 |
| 5,075,821 A | 12/1991 | McDonnal |
| 5,090,919 A | 2/1992 | Tsuji .............................. 439/519 |
| 5,101,322 A | 3/1992 | Ghaem et al. .................. 361/386 |
| 5,132,890 A | 7/1992 | Blandino |
| 5,235,491 A | 8/1993 | Weiss ............................ 361/694 |
| 5,295,044 A | 3/1994 | Araki et al. .................... 361/709 |
| 5,365,403 A | 11/1994 | Vinciarelli et al. ............ 361/707 |
| 5,673,185 A | 9/1997 | Albach et al. |
| 5,811,895 A | 9/1998 | Suzuki et al. .................. 307/125 |
| 5,838,554 A | 11/1998 | Lanni ............................. 363/21 |
| 5,859,771 A | 1/1999 | Kniegl |
| 5,923,543 A | 7/1999 | Choi .............................. 363/21 |
| 6,183,302 B1 | 2/2001 | Daikuhara et al. ............. 439/608 |

(Continued)

FOREIGN PATENT DOCUMENTS

GB   2252208 A   7/1992

(Continued)

OTHER PUBLICATIONS

"New Architectures for Radio-Frequency dc/dc Power Conversion", Juan Rivas et al., Laboratory for Electromagnetic and Electronic Systems, Massachusetts Institut eof Technology, Room 10-171 Cambridge, MA 02139, pp. 4074-4084.

(Continued)

*Primary Examiner* — Jared J Fureman
*Assistant Examiner* — Dru M Parries
(74) *Attorney, Agent, or Firm* — Haverstock & Owens LLP (57) ABSTRACT

A power adaptor and storage unit is configured to simultaneously provide power to a portable electronic device and to a portable power module. In some cases, the portable power module is integrated into the power adaptor. The power adaptor receives power unusable by the electronic device, converts it to a usable form, stores some of the converted power if possible, and supplies the power to the device.

20 Claims, 6 Drawing Sheets

U.S. PATENT DOCUMENTS

| | | | |
|---|---|---|---|
| 6,272,015 B1 | 8/2001 | Mangtani | 361/707 |
| 6,282,092 B1 | 8/2001 | Okamoto et al. | 361/704 |
| 6,388,897 B1 | 5/2002 | Ying et al. | |
| 6,390,854 B2 | 5/2002 | Yamamoto et al. | 439/620 |
| 6,452,362 B1* | 9/2002 | Choo | 320/116 |
| 6,459,175 B1 | 10/2002 | Potega | 307/149 |
| 6,549,409 B1 | 4/2003 | Saxelby, Jr. et al. | 361/704 |
| 6,578,253 B1 | 6/2003 | Herbert | 29/605 |
| 6,775,162 B2 | 8/2004 | Mihai et al. | 363/141 |
| 7,038,406 B2 | 5/2006 | Wilson | |
| 7,208,833 B2 | 4/2007 | Nobori et al. | 257/704 |
| 7,274,175 B2 | 9/2007 | Manolescu | |
| 2002/0008963 A1 | 1/2002 | Dibene, II et al. | 361/720 |
| 2002/0011823 A1 | 1/2002 | Lee | 320/137 |
| 2003/0035303 A1 | 2/2003 | Balakrishnan et al. | 363/16 |
| 2004/0008532 A1 | 1/2004 | Asawa | |
| 2004/0263123 A1* | 12/2004 | Breen et al. | 320/128 |
| 2005/0024016 A1* | 2/2005 | Breen et al. | 320/128 |
| 2005/0138437 A1* | 6/2005 | Allen et al. | 713/300 |
| 2005/0225257 A1 | 10/2005 | Green | |
| 2006/0022637 A1* | 2/2006 | Wang et al. | 320/112 |
| 2006/0152947 A1 | 7/2006 | Baker et al. | |
| 2007/0018947 A1* | 1/2007 | Toro-Lira | 345/156 |
| 2007/0079153 A1* | 4/2007 | Bain et al. | 713/300 |
| 2010/0289466 A1 | 11/2010 | Telefus | |
| 2010/0322441 A1 | 12/2010 | Weiss et al. | |

FOREIGN PATENT DOCUMENTS

WO    WO 2005/122377 A1    12/2005

OTHER PUBLICATIONS

EE Times.com—"Team Claims Midrange Wireless Energy Transfer", by R. Colin Johnson, 4 pages, Nov. 6, 2007.

EE Times.com—"Wireless Bacon Could Recharge Consumer Devices", by R. Colin Johnson, 3 pages, Nov. 6, 2007.

Hang-Seok Choi et al., Novel Zero-Voltage and Zero-Current-Switching (ZVZCS) Full-Bridge PWM Converter Using Coupled Output Inductor, 2002 IEEE, pp. 641-648.

EE Times.com—"Wireless Beacon Could Recharge Consumer Devices", by R. Colin Johnson, 3 pages, Nov. 6, 2007.

\* cited by examiner

Fig. 6

POWER ADAPTOR AND STORAGE UNIT FOR PORTABLE DEVICES

RELATED APPLICATIONS

This application claims benefit of priority under 35 U.S.C. section 119(e) of the U.S. Provisional Patent Application filed Feb. 2, 2006, entitled "POWER ADAPTOR/BACKUP UNIT FOR PORTABLE DEVICES," which is hereby incorporated by reference.

FIELD OF THE INVENTION

This invention relates generally to the field of power adaptors provided for portable, battery-powered consumer electronics.

BACKGROUND

Currently, there are a wide variety of portable, battery-powered consumer electronics products. Examples include cellular phones, digital cameras, laptop computers, and MP3 players. Typical products in this category are equipped with rechargeable batteries. However, in other cases such products are equipped to receive disposable batteries.

Most such products provide a DC power input, whether or not they come packaged with an external power adaptor. The DC power input is configured to receive an appropriate DC voltage to recharge the rechargeable battery, if present, and to power the device.

Power adaptors configured to supply DC power to such devices are well known. Typical examples include AC/DC adaptors configured to plug in to common household outlets, receive power at household AC, convert it to a DC voltage appropriate to the device, and supply the converted power to the DC device. Other examples include DC/DC converters adapted to receive power from automobile outlets (cigarette lighters) at 12 volts, convert it to a DC voltage appropriate to the device, and supply the converted power to the device.

Indeed, many modern devices that include rechargeable batteries come packaged with at least an AC/DC adaptor. Thus, when battery power runs low, and an outlet is available, the device can easily be powered and recharged simply by plugging the adaptor in and connecting it to the device.

Unfortunately, outlets, household or otherwise, and other power sources are not always available. A variety of portable power modules (PPM) have been marketed to solve this problem. A PPM is essentially a spare battery, designed to couple with a DC input of a DC powered device, such as a cellular phone, and discharge to provide an appropriate voltage.

The batteries within PPMs receive their power in a variety of ways. Some are configured to receive disposable batteries and convert their power to an appropriate voltage. Other PPMs include rechargeable batteries, and are configured to receive DC power through an input similar to those found in typical DC powered devices. Since a PPM for a given DC powered device is usually bought aftermarket, a typical arrangement is for that PPM to be configured to receive power from the AC/DC adaptor of that device, charging its battery.

Unfortunately, this design forces a user of a given DC powered device, say a cellular phone, needs to carry both its AC/DC adaptor and an appropriate PPM in order to ensure that extra power is available in every situation. Further, in order to recharge both the cellular phone and the PPM battery, the user must swap the output of the AC/DC adaptor between the two.

SUMMARY OF THE DISCLOSURE

The preferred embodiment of the present invention combines a power adaptor capable of taking power from AC/DC lines or from DC power sources such as automobile DC outlets, and a battery backup module into a single unit. The invention relates to a power adaptor capable of simultaneously charging a portable power module and the portable electronic device for which the adaptor is intended. Preferably, the power adaptor of the present invention is intended for an electronic device configured to selectively operate using one of an input power, an internal battery and a portable power module. Further, in some embodiments, adaptors receive power in a form otherwise unusable by the electronic device. Some embodiments receive power in a form otherwise non-storable, and convert the power to a storable form. In each case, 'storable' means suitable for storage using the storage units, or devices of a given embodiment. Similarly, 'usable' means able to power and/or charge the portable electronic device or devices for which the embodiment is intended.

For example, in some embodiments a power adaptor and storage unit comprises a first circuit for receiving a source power in a form unusable by the electronic device from an external source and converting the source power to the input power, a pass-through circuit for providing the input power for powering the electronic device, a storage circuit for storing the input power into the portable power module, and a discharge circuit for providing the input power for powering the electronic device from the portable power module.

Some embodiments include a power adaptor and storage unit for a portable device. The unit comprises a power converter unit, an energy storage unit, a power pass-through unit, a power output unit, and a controller unit. A variety of specific capabilities and configurations of these elements are considered.

For example, the power converter unit is configured to selectively receive power from an external source in a form unusable by the portable device and to simultaneously produce usable power and storable power therefrom. The energy storage unit is coupled to the power converter unit and configurable to receive the storable power therefrom and to store it as energy. The power pass-through unit is coupled to the power converter unit and configurable to channel the usable power therethrough to the portable device. The power output unit is coupled to the energy storage unit and configurable to produce usable power from the energy within the energy storage unit and to supply it to the portable device. The controller unit is configured to control the provision of storable power from the power converter unit to the energy storage unit, and to control the channeling of usable power through the power pass-through unit to the portable device, and to control the provision of energy from the energy storage unit through the power output unit to the portable device. In some embodiments a controller unit is also capable of monitoring various parameters and providing protection functions, e.g. temperature protection, over-current, and over-voltage protection.

Some embodiments include a power adaptor and backup power unit for an electronic device. The unit comprises a power converter, an energy storage unit, first, second and third switching modules, and a controller. A variety of specific capabilities and configurations of these elements are considered.

For example, the power converter is configured to selectively receive power unusable by the electronic device from an external supply and to produce converted power usable by the electronic device. The energy storage unit has an input coupled to the power converter through a first switching module and an output coupled a second switching module. The third switching module is coupled to the power converter. The controller is coupled to the first, second and third switching modules, and configured to control the operation of the first, second, and third switching modules to optionally provide converted power from the power converter to an output of the power adaptor and backup power device through one of the energy storage unit and the third switching module. In some embodiments, the third switching module is a pass-through switch, the first switching module is a storage switch, and the second switching module is a discharge switch.

Some embodiments include a power adaptor and storage unit for a portable electronic device. The adaptor and storage unit comprises a power converter unit, a storage unit, an output unit, and a controller. A variety of specific capabilities and configurations of these elements are considered.

For example, a power converter unit consistent with some embodiments is configured to optionally receive power in a form unusable by the device from an external source and to produce a first usable power output and a storable power output from the received power when power is being received from the external source. A storage unit consistent with some embodiments has an energy level and a total capacity configured to receive the storable power output from the power converter unit and store it as energy if the energy level is less than the total capacity. An output unit consistent with some embodiments is configurable to receive energy from the storage unit and to produce a second usable power output from the received energy. A controller consistent with some embodiments is configured to determine if the power converter is receiving power from the external source, and if it is not, to direct the output unit to produce the second usable power output and to supply the second usable power output to the portable device.

For example, in some embodiments, a power adaptor/ backup unit connects to the DC input of a DC powered device, providing an external power source. In some use cases the unit provides battery power, while in others it provides power converted from another source, e.g. household AC, car DC, to the DC powered device while simultaneously storing power to the internal battery. Embodiments of this each include a battery, a charging circuit, a discharging circuit, and a pass-through, as well as a microcontroller to ensure proper power management. Each of these embodiments provides for connection to an external power source both to charge the battery and to provide converted power through the pass-through to the DC powered device. Notably, these embodiments permit simultaneous execution of charging and providing converted power to the DC powered device.

DETAILED DESCRIPTION OF THE EMBODIMENTS OF THE INVENTION

Broad embodiments of the present invention are discussed below with reference to the included drawings. The discussion of the specific components of these embodiments should not be taken to disclaim equivalents of the structures described herein.

Portable Electronics & Power Modules

Figure 4A:
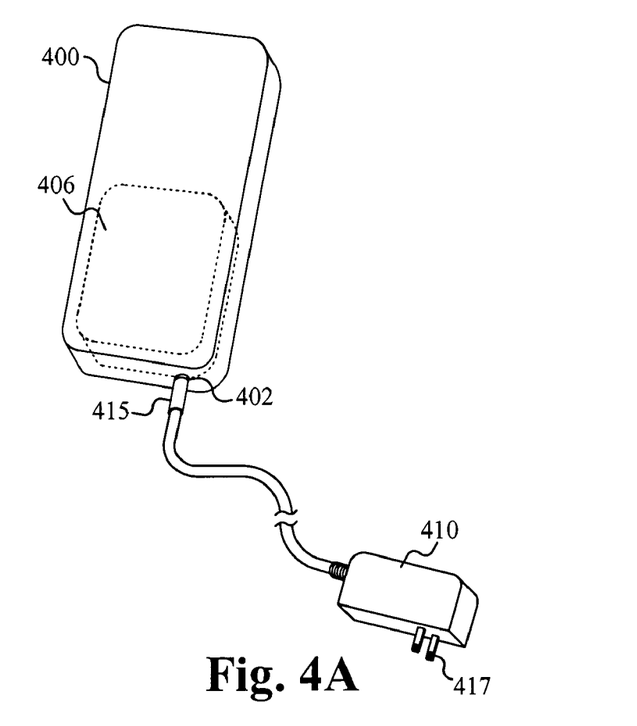
FIG. 4A illustrates a typical portable electronic device and an exemplary adaptor.
Figure 4B:
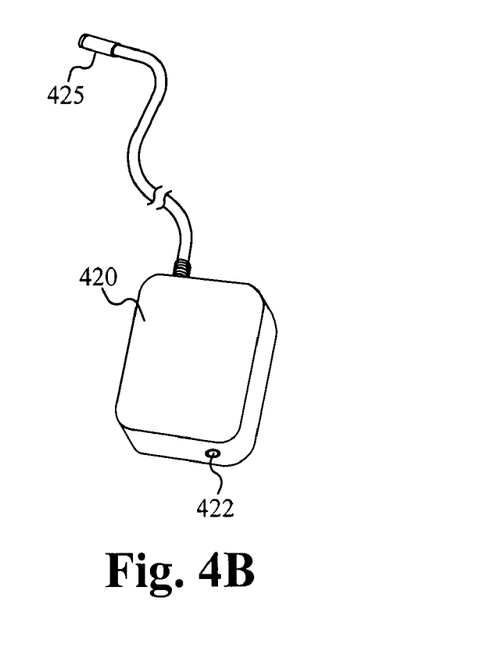
FIG. 4B illustrates an exemplary portable power module.

FIGS. 4A and 4B illustrate a typical portable electronic device 400, its power adaptor 410, and a portable power module (PPM) 420. Portable electronics, such as the device 400, are most often shipped with two sources of power. As is typical, the device 400 includes a power input 402, and an internal battery 406. The device 400 can operate on power drawn from the internal battery 406, or from the power input 402. Increasingly, portable devices are equipped with rechargeable batteries that are electrically coupled to the power input to permit recharging.

Such devices are usually designed for use with power adaptors. For example, the device 400 is shown with the power adaptor 410 attached. When an external power source is available, the power adaptor serves to convert the external power to a form usable by the device, and to supply the converted power to the power input of the device. Thus, a user can charge the internal battery of the device, and/or operate the device on input power.

The power adaptor 410 includes the contacts 417 for coupling to an external power source, in this case an AC outlet. Further, the power adaptor 410 includes the output coupling 415, which is configured to couple with an electronic device's power input. In FIG. 4A, the coupling 415 is connected to the power input 402 of the portable electronic device 400.

A variety of backup power devices are designed for use with portable electronic devices. For example, the portable power module 420, shown in FIG. 4B, is adapted for use with the device 400. As is typical, the PPM 420 includes the power input 422, and the power output 425, as well as a battery (not shown). The power input 422 is configured to couple with the power coupling 415 of the power adaptor 410, and receives power therefrom when the power adaptor 410 is connected to an external power source. The power output 425 is configured to couple with the power input 402 of the portable electronic device 400. When the battery has charge and the power output 425 is coupled to the power input 402, the portable power module 400 provides power to the electronic device 400 to operate the device or charge the internal battery 406.

Structure

Figure 1:
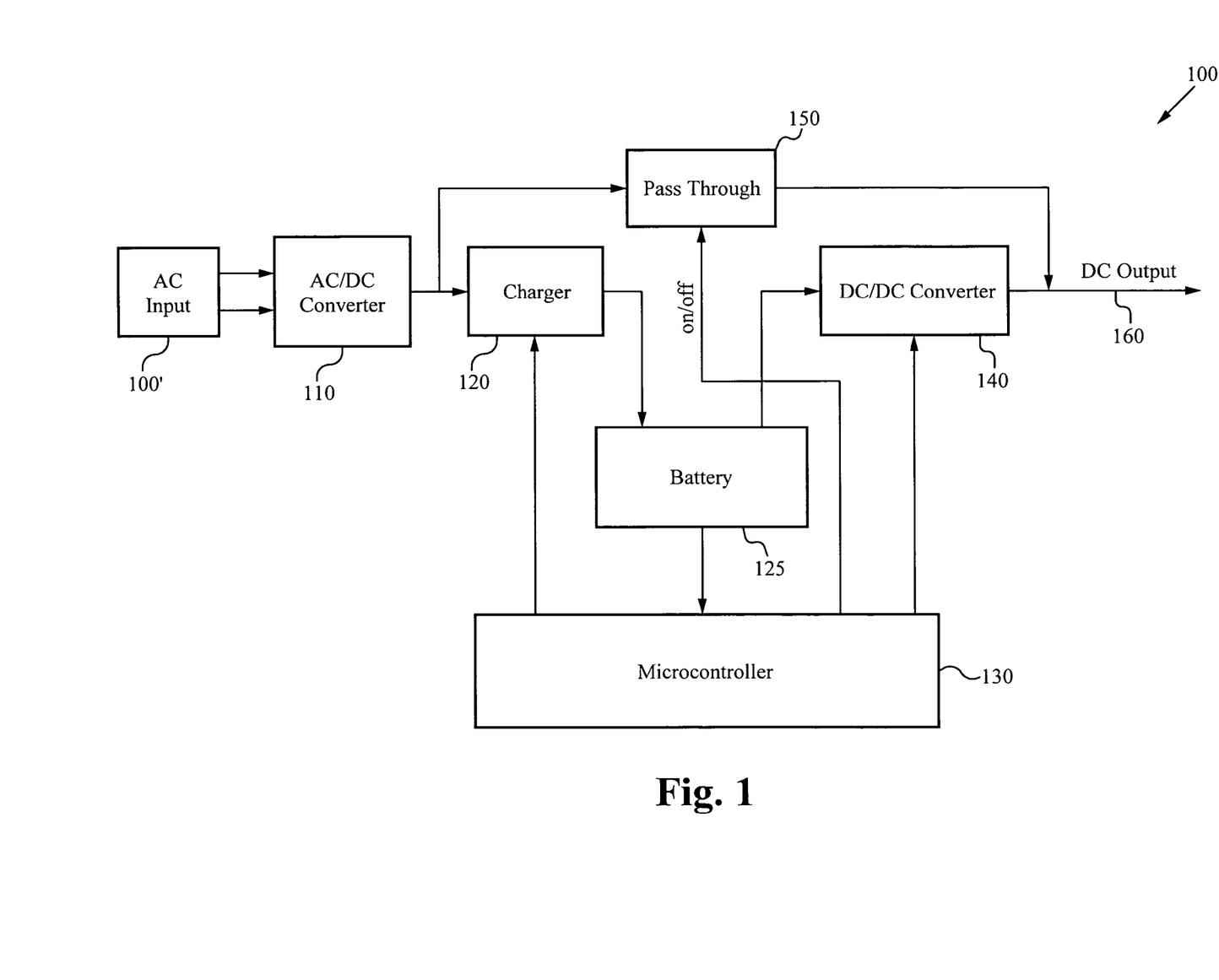
FIG. 1 illustrates the preferred embodiment of the present invention, which provides AC/DC conversion as well as backup battery power.

In a first embodiment, discussed with reference to FIG. 1, an AC power adaptor/backup unit 100 includes an AC/DC converter 110 coupled to an input. The AC/DC converter 110 can be removably coupled to an external AC power source. In FIG. 1, the input of the AC power adaptor/backup unit 100 is removably coupled to the AC external power source 100'. The output of the AC/DC converter 110 is coupled to both the pass-through 150 and the charger circuit 120. The charger circuit 120 includes a battery 125, which is also coupled to the DC/DC converter 140, which acts as a discharging circuit. The pass-through 150, the charger circuit 120, and the DC/DC converter 140 are all coupled to a microcontroller 130, which senses a charge level of the battery 125. The pass-through 150 and the DC/DC converter 140 both couple to the DC output 160, which can be coupled to a DC device (not shown).

Figure 2:
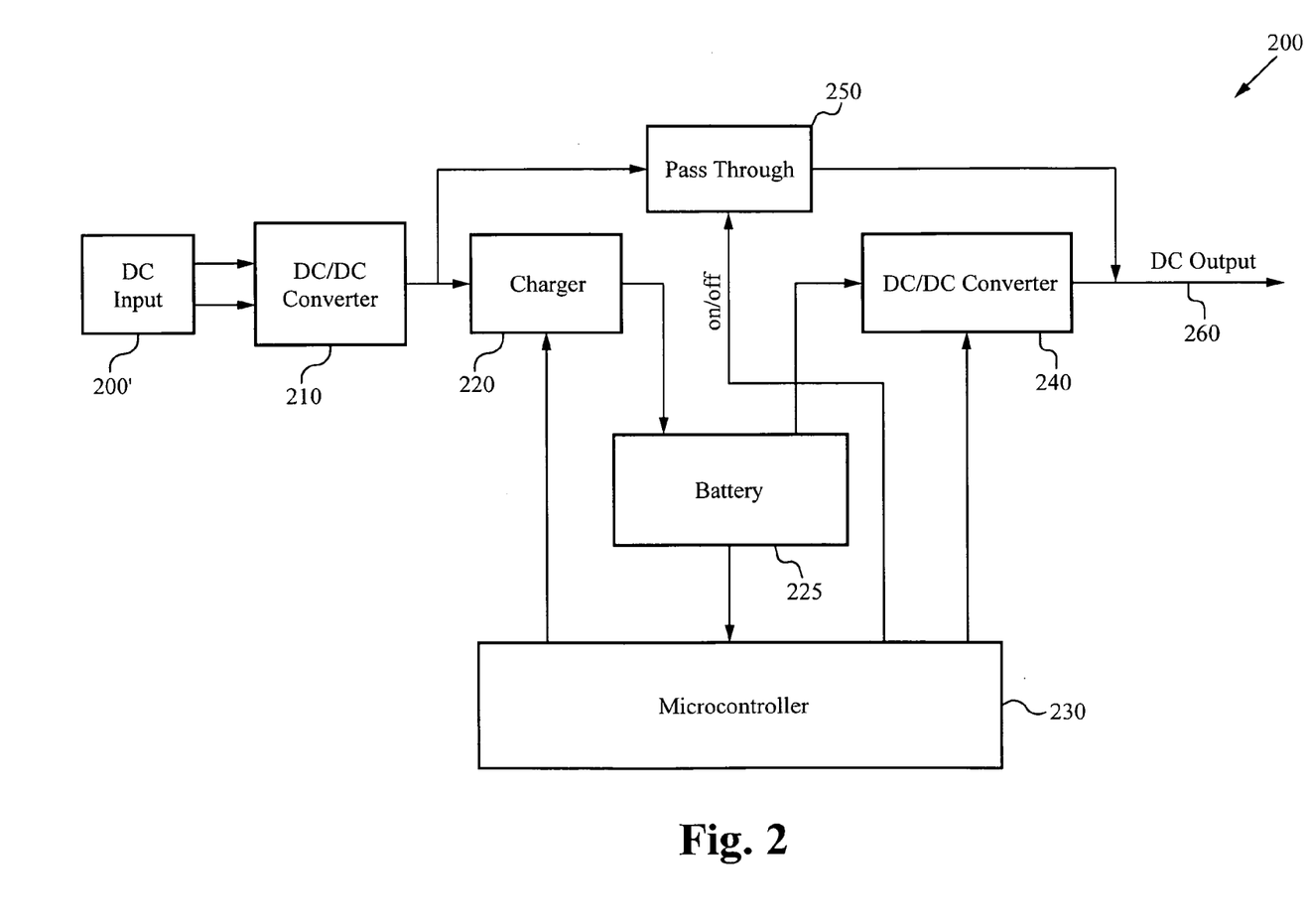
FIG. 2 illustrates an alternative embodiment of the present invention, which provides DC/DC conversion as well as backup battery power.

In a second embodiment, discussed with reference to FIG. 2, a DC power adaptor/backup unit 200 includes a primary DC/DC converter 210 coupled to an input. The primary DC/DC converter 210 can be removably coupled to an external DC power source. In FIG. 2, the input of the DC power adaptor/backup unit 200 is removably coupled to the DC external power source 200'. The output of the primary DC/DC converter 210 is coupled to both the pass-through 250 and the charger circuit 220. The charger circuit 220 includes a battery 225, which is also coupled to the secondary DC/DC converter 240, which acts as a discharging circuit. The pass-through 250, the charger circuit 220, and the DC/DC converter 240 are all coupled to a microcontroller 230, which senses a charge level of the battery 225. The pass-through 250 and the DC/DC converter both couple to the DC output 260, which can be coupled to a DC device (not shown).

The second embodiment can include power connectors and converters adapted to handle a variety of non-specialized power sources. Examples include outputs of various AC/DC adaptors, such as laptop power sources, as well as solar DC, and automotive DC.

Figure 3:
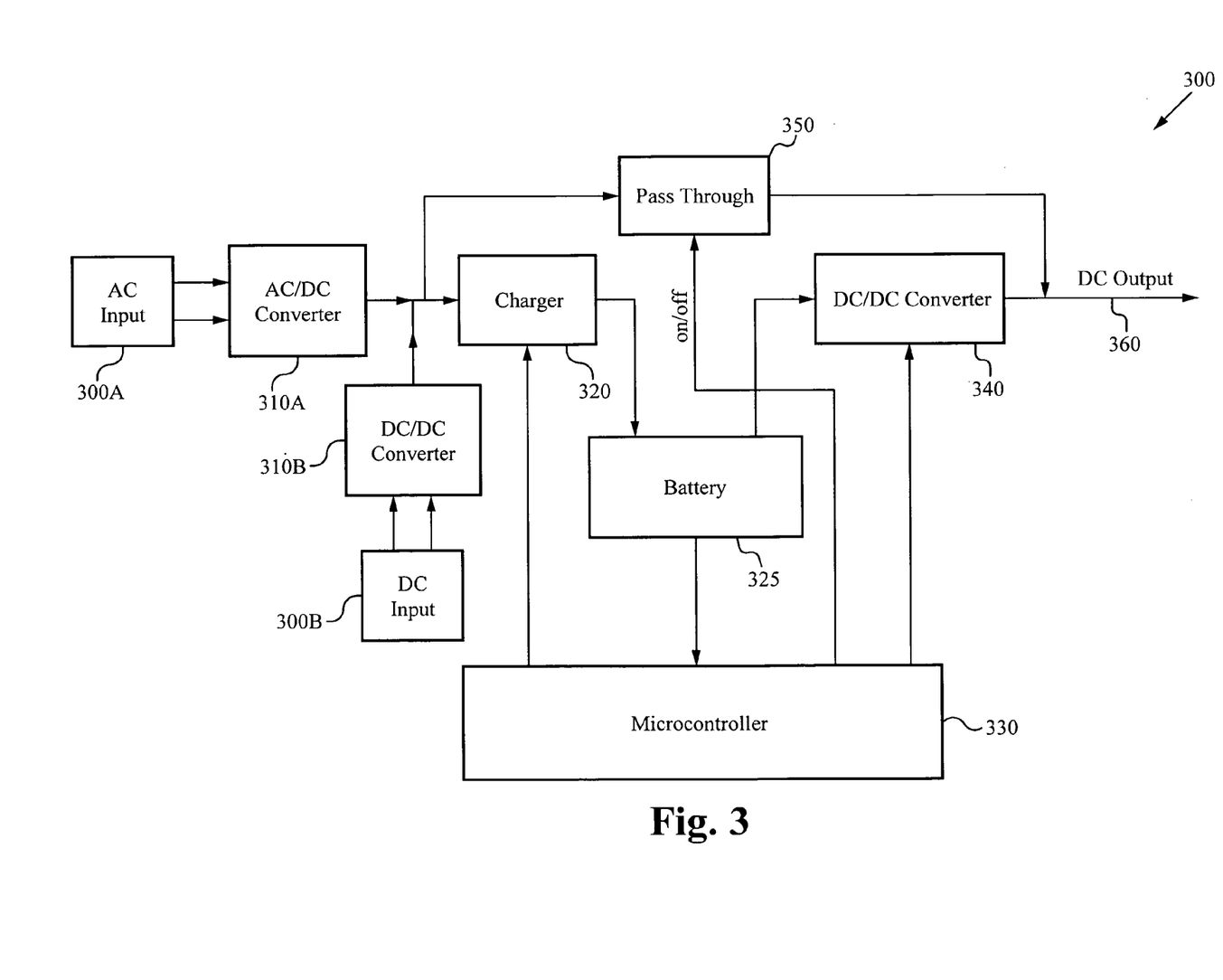
FIG. 3 illustrates an alternative embodiment of the present invention, which provides DC/DC conversion and AC/DC conversion as well as backup battery power.

In a third embodiment, discussed with reference to FIG. 3, an AC or DC power adaptor/backup unit 300 includes an AC/DC converter 310A coupled to a first input and a primary DC/DC converter 310B coupled to a second input. The primary DC/DC converter 310 can be removably coupled to an external DC power source. In addition, the AC/DC converter 310A can be removably coupled to an external AC power source. In FIG. 3, neither input of the DC power adaptor/backup unit 300 is removably coupled to a power source. The outputs of the primary DC/DC converter 310B and the AC/DC converter 310A are coupled to both the pass-through 350 and the charger circuit 320. Though in the figure the converters 310A and 310B are coupled with one another, preferably this is done in a manner to prevent flow of current from one into another.

The charger circuit 320 includes a battery 325, which is also coupled to the secondary DC/DC converter 340, which acts as a discharger circuit. The pass-through 350, the charger circuit 320, and the secondary DC/DC converter 340 are all coupled to a microcontroller 330, which senses a charge level of the battery 335. The pass-through 350 and the secondary DC/DC converter both couple to the DC output 360, which can be coupled to a DC device (not shown).

Figure 5A:
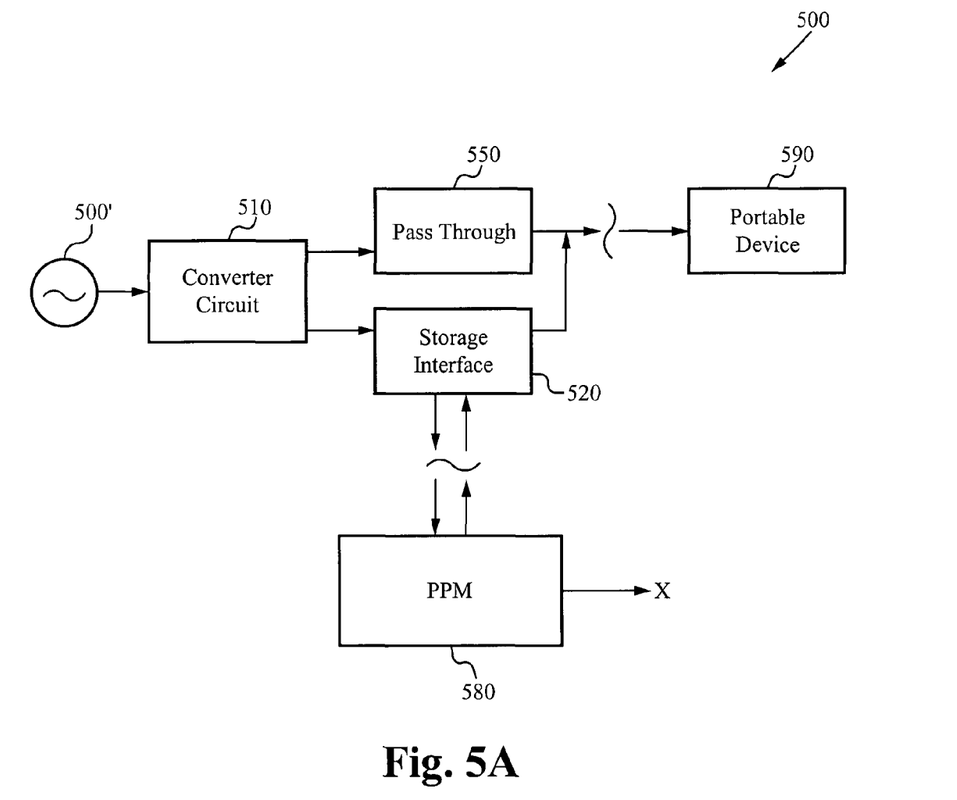
FIG. 5A illustrates a power adaptor consistent with some embodiments of the present invention, as well as its potential interaction with a portable power module and a portable device.

FIG. 5A illustrates another type of embodiment of the present invention. The power adaptor and storage unit 500 includes a converter circuit 510 coupled to an input. The converter circuit 510 can be removably coupled to an external power source. In FIG. 5A, the input of the system 500 is removably coupled to the external power source 500'. The output of the converter circuit 510 is coupled to both the pass-through 550 and the storage interface 520.

The storage interface 520 couples with a portable power module 580, both for storing power into the PPM 580, and for discharging power from the PPM 580. Further, the storage interface 520 couples through the output of the system 500 to the portable device 590.

The PPM 580 is selectively couplable to the storage interface 520 for both receiving power from the adaptor and for discharging power into the adaptor for delivery to the portable device 590. Further, the PPM 580 optionally couples directly with the portable device 590 and delivers power directly. FIG. 5A illustrates the PPM 580 consistent with the system 500 delivering power to the portable device 590.

Figure 6:
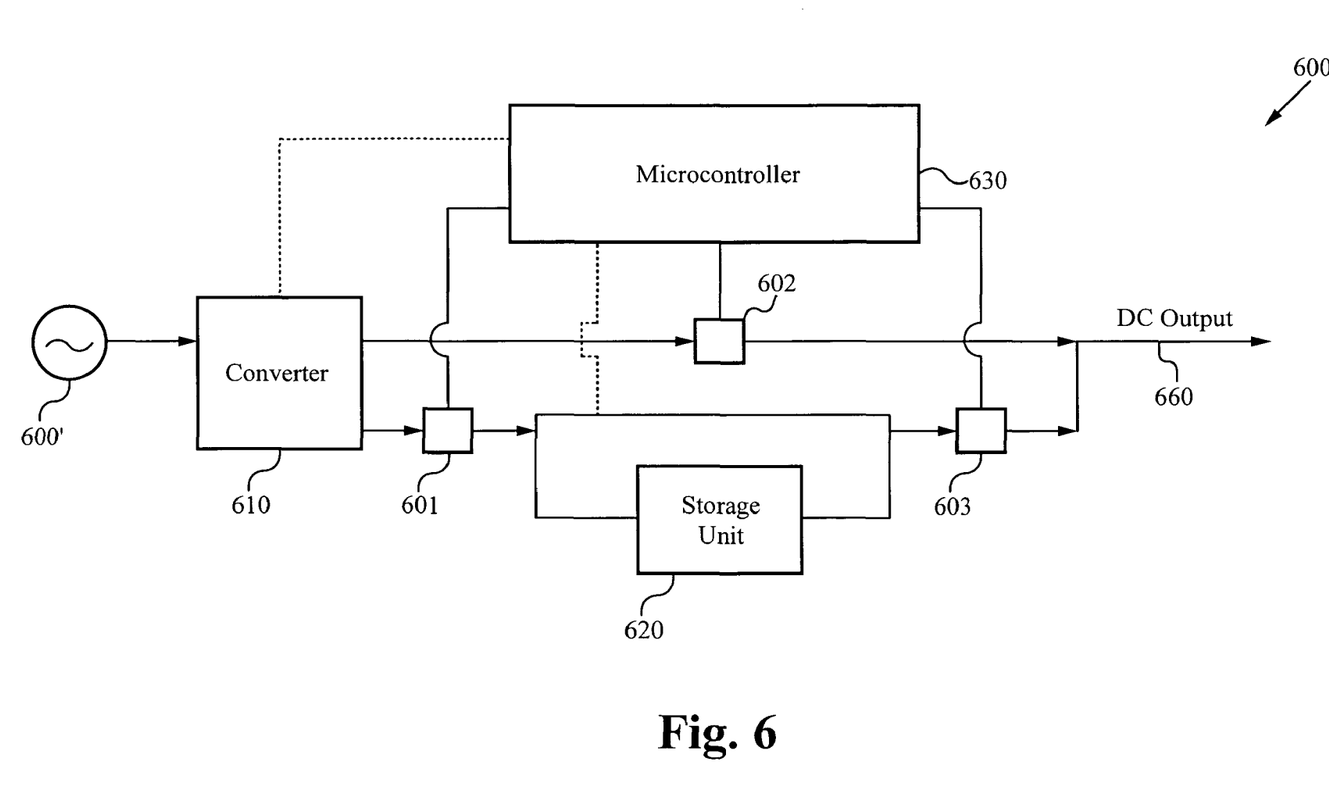
FIG. 6 illustrates a power adaptor and backup power unit consistent with some embodiments of the present invention.

FIG. 6 illustrates another type of embodiment of the present invention. The power adaptor and backup 600 includes a converter circuit 610 coupled to an input. The converter circuit 610 can be removably coupled to an external power source. In FIG. 6, the input of the system 600 is removably coupled to the external power source 600'. The output of the converter circuit 610 is coupled to both the pass-through switch 602 and the storage switch 601.

The storage switch 601 is coupled to the storage system 620, which is also coupled to the discharge switch 603. The storage unit 620 receives power through the storage switch 601 when it is actuated and the converter circuit 610 is powered. The storage unit 620 discharges power through the discharge switch 603 when it is actuated and a load is present. The pass-through switch 602, the storage switch 601, and the discharge switch 603 are all coupled to a controller 630, which operates the various switches to control power delivery and storage. The pass-through switch 602 and the discharge switch 603 both couple to the output 660, which can be coupled to an electronic device (not shown).

In some embodiments, the controller 630 is coupled to the converter circuit 610 and/or the storage unit 620 for determining and/or controlling characteristics thereof during operation. For example, in some embodiments the controller 630 determines a charge level or energy level within the storage unit 620.

Operation

Operation of the embodiments related to FIGS. 1 to 3 is similar enough at a high level that it can be discussed simultaneously. Hence, though the discussion below references only FIG. 1, it is equally applicable to FIG. 2 or 3 if the appropriate component names are substituted.

The power adaptor/backup unit 100 has several phases of operation, including pure charging, charging and converting, pure converting, and discharging. This discussion of these phases focuses on ideal behavior. With the leakages present in electronic logic, this ideal behavior is only approximated by the behavior of an actual unit.

During pure charging phase, the unit 100 is coupled with an external power source, e.g. 100', whereby the AC/DC converter 110 receives power. Further, the DC output 160 of the unit is not electrically connected to a device and presents an open circuit. The controller 130 senses the open circuit on the DC output 160, shutting down the pass-through 150 and the DC/DC converter 140.

Power received by the AC/DC converter 110 is converted from AC to DC and supplied to the charger circuit 120. Under control of the microcontroller 130, the charger circuit 120 supplies the DC power to the battery 125, charging it. Though the AC/DC converter 110 also couples to the pass-through 150, little, if any, current flows between the two. In addition, the shut down DC/DC converter 140 limits any discharge of the battery 125. Preferably, the microcontroller 130 senses when the battery 125 is completely charged, and then limits input to the charger circuit 120.

During charging and converting phase, the unit 100 is coupled with an external power source, e.g. 100', whereby the AC/DC converter 110 receives power. In this phase, the DC output 160 of the unit is electrically connected to a DC powered device, which draws power from the unit 100. The controller 130 modulates discharge of the battery 125 through the DC/DC converter 140, to minimize charging time while maintaining proper voltage through the DC output 160.

Power received by the AC/DC converter 110 is converted from AC to DC and supplied to the charger circuit 120, as well as the pass-through 150. Under control of the microcontroller 130, the charger circuit 120 supplies the DC power to the battery 125, charging it. Also under control of the microcontroller 130, the pass-through 150 supplies converted DC voltage through the DC output 160 to the DC powered device. Preferably, the microcontroller 130 senses when the battery 125 is completely charged, and then limits input to the charger circuit 120, as well as discharge through the DC/DC converter 140. At this point the unit 100 enters pure converting phase.

During pure converting phase, the unit 100 is coupled with an external power source, e.g. 100', whereby the AC/DC converter 110 receives power. In this phase, the DC output 160 of the unit is electrically connected to a DC powered device, which draws power from the power source 100' through the unit 100. The controller 130 limits discharge of the battery 125 through the DC/DC converter 140 and the pass-through 150.

Power received by the AC/DC converter 110 is converted from AC to DC and supplied to the pass-through 150. Under control of the microcontroller 130, the charger circuit 120 limits its power consumption. Also under control of the microcontroller 130, the pass-through 150 supplies converted DC voltage through the DC output 160 to the DC powered device. If the unit 100 is disconnected from the external power source while supplying power, it enters discharge phase.

During discharge phase, the unit 100 is not coupled with an external power source, and the AC/DC converter 110 receives no power. In this phase, the DC output 160 of the unit is electrically connected to a DC powered device, which draws power from the unit 100. The controller 130 modulates discharge of the battery 125 through the DC/DC converter 140 to maintain proper voltage through the DC output 160. Under control of the microcontroller 130, power is supplied from the battery 125 through the DC/DC converter, and the DC output 160 to the DC powered device.

Figure 5B:
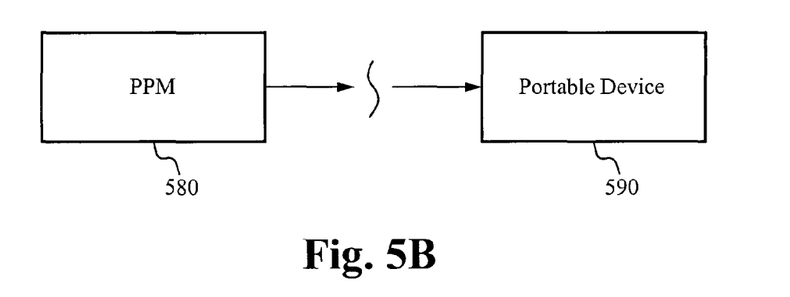
FIG. 5B illustrates potential interaction between a portable power module and an electronic device.

The system 500 illustrated in FIGS. 5A and 5B also has several phases of operation. These include pure storage, storage and supply, pure supply, and discharge. This discussion of these phases focuses on ideal behavior. With the leakages present in electronic logic, this ideal behavior is only approximated by the behavior of an actual unit.

During pure storage phase, the unit 500 is coupled with an external power source, e.g. 500', whereby the converter circuit 510 receives power. Further, the unit 500 and the portable device 590 are not electrically connected, so the pass-through 550 and the storage interface 520 are presented with an open circuit. The discharging elements of the storage interface 520 are shut down due to the open circuit.

Power received by the converter circuit 510 is converted and supplied to the storage interface 520. From the storage interface 520, the converted power is supplied to the PPM 580, where it is stored, e.g. by charging a battery. Though the converter circuit 510 also couples to the pass-through 550, little, if any, current flows between the two. In addition, the shut down discharging elements limit any discharge of power from the PPM 580 through the storage interface 520.

During storage and supply phase, the unit 500 is coupled with an external power source, e.g. 500', whereby the converter circuit 510 receives power. In this phase, the unit is electrically connected to a portable device 590, which draws power from the unit 500. The discharge elements of the storage interface 520 draw little, if any, stored power from the PPM, to minimize charging time. Simultaneously, the converter circuit 510 supplies converted power through the pass through 550 at an appropriate voltage for the device 590.

Power received by the converter circuit 510 is converted and supplied to the storage interface 520, as well as the pass-through 550. The storage interface 520 supplies the converted power to portable power module 580, where it is stored. The pass-through 550 supplies converted power to the device 590. Preferably, the storage interface 520 limits input to the portable power module 580 once the PPM 580 is full. At this point the unit 500 enters pure supply phase.

During pure supply phase, the unit 500 is coupled with an external power source, e.g. 500', whereby the converter circuit 510 receives power. In this phase, the unit is electrically connected to a portable device 590, which draws power from the unit 500. The discharge elements of the storage interface 520 draw little, if any, stored power from the PPM, to minimize charging time. Simultaneously, the converter circuit 510 supplies converted power through the pass through 550 at an appropriate voltage for the device 590.

Power received by the converter circuit 510 is converted and supplied to the pass-through 550. The storage interface 520 limits the power consumption of the full PPM 580 The pass-through 550 supplies converted power to the device 590. If the unit 500 is disconnected from the external power source while supplying power, it enters discharge phase.

During discharge phase, the unit 500 is not coupled with an external power source, and the converter circuit 510 receives no power. In this phase, the unit is electrically connected to the device 590, which draws power from the unit 500. The storage interface 520 modulates discharge from the PPM 580 to maintain proper voltage to the device 590.

As illustrated in FIG. 5B, the unit 500 supports a variant of the discharge phase where the portable power module 580 is directly connected to the portable device 590. In this phase, the PPM 580 has already been charged via the converter circuit 510 and storage interface 520. Preferably, to support this variant, the PPM 580 includes a discharge element separate from its interface with the storage interface 520 and configurable for direct interface with the device 590. In some embodiments, the interface of the PPM 580 with storage interface 520 is configurable to couple with the device 590.

The system 600 of FIG. 6 also has several phases of operation. These include pure storage, storage and supply, pure supply, and discharge. This discussion of these phases focuses on ideal behavior. With the leakages present in electronic logic, this ideal behavior is only approximated by the behavior of an actual unit.

During pure storage phase, the unit 600 is coupled with an external power source, e.g. 600', whereby the converter circuit 610 receives power. Further, the unit 600 is not electrically connected to a device, so the pass-through switch 602 and the discharge switch 603 are presented with an open circuit. The discharge switch 603 is shut down due to the open circuit, which preferably is sensed by the controller 630. The power supplied from the converter circuit 610 is preferably sensed by the controller 630, which actuates the storage switch 601.

Power received by the converter circuit 610 is converted and supplied to the storage unit 620 through the storage switch 601. Within the storage unit 620, the converted power is stored, e.g. by charging a battery. Though the converter circuit 610 also couples to the pass-through switch 602, little, if any, current flows between the two. In addition, the shut down discharge switch 603 limits any discharge of power from the storage unit 620.

During storage and supply phase, the unit 600 is coupled with an external power source, e.g. 600', whereby the converter circuit 610 receives power. In this phase, the unit is electrically connected to a portable device (not shown), which draws power from the unit 600. The discharge switch 603 is switched off, so little, if any, stored power is drawn from the storage unit 620, to minimize charging time. Simultaneously, the converter circuit 610 supplies converted power through the pass-through switch 602 at an appropriate voltage for the device 690.

Power received by the converter circuit 610 is converted and supplied to the storage unit 620, as well as the pass-through switch 602. The storage unit 620 supplies the converted power to storage unit 620, where it is stored. The pass-through switch 602 supplies converted power to the output 660. Preferably, the controller 630 limits input by switching off the storage switch 601 once the storage unit 620 is full. At this point the unit 600 enters pure supply phase.

During pure supply phase, the unit 600 is coupled with an external power source, e.g. 600', whereby the converter circuit 610 receives power. In this phase, the unit is electrically connected to a portable device (not shown), which draws power from the unit 600. The discharge switch 603 is off, so little, if any, stored power is discharged from the storage unit 620, to minimize charging time. Simultaneously, the converter circuit 610 supplies converted power through the pass-through switch 602 to the output 660 at an appropriate voltage for the device supplied.

Power received by the converter circuit 610 is converted and supplied to the pass-through switch 602. The controller 630 limits the power consumption of the storage unit 620 by switching the storage switch 601 off. The pass-through switch 602 supplies converted power to the output 660 and the device beyond. If the unit 600 is disconnected from the external power source while supplying power, it enters discharge phase.

During discharge phase, the unit 600 is not coupled with an external power source, and the converter circuit 610 receives no power. In this phase, the unit is electrically connected to a device through the output 660, and the device draws power from the unit 600. The controller 630 and the storage unit 620 modulate discharge from the storage unit 620 to maintain proper voltage to the device.

Use

During normal use, a power adaptor/backup unit will transition between the various phases of use quite frequently. In the preferred embodiment the microcontroller included in the unit is configured to optimally handle all possible conversions, managing power to balance between quick battery charging and effective, consistent power distribution.

The present invention has been described in terms of specific embodiments incorporating details to facilitate the understanding of the principles of construction and operation of the invention. As such, references herein to specific embodiments and details thereof are not intended to limit the scope of the claims appended hereto. It will be apparent to those skilled in the art that modifications can be made to the embodiments chosen for illustration without departing from the spirit and scope of the invention.

We claim:

1. A power adaptor and storage unit for providing input power to an electronic device, comprising:
    a. a housing, separate from the electronic device;
    b. a portable power module, detachably coupled to the housing;
    c. a first circuit disposed within the housing, the first circuit for optionally receiving a source power in a form unusable by the electronic device from an external source and converting the source power to the input power;
    d. a pass-through circuit disposed within the housing, the pass-through circuit for selectively providing the input power from the first circuit to the electronic device;
    e. a storage circuit disposed within the housing, the storage circuit for selectively storing the input power from the first circuit into the portable power module; and
    f. a discharge circuit disposed within the housing, the discharge circuit for selectively providing the input power to the electronic device from the portable power module;
    g. a control circuit coupled to the first circuit, the pass-through circuit, the storage circuit, the discharge circuit, and the portable power module, and the control circuit is configured to disable the pass-through circuit, disable the discharge circuit, and enable the storage circuit when the first circuit is coupled to the source power and the electronic device is not connected to the power adaptor and storage unit.

2. The power adaptor and storage unit of claim 1, wherein the source power is AC power and the input power is DC power.

3. The power adaptor and storage unit of claim 1, wherein the source power is DC power of one voltage and the input power is DC power of a different voltage.

4. The power adaptor and storage unit of claim 1, further comprising a second circuit for receiving a different type of source power, also in form unusable by the electronic device, and converting the different type of source power to the input power.

5. The power adaptor and storage unit of claim 4, wherein the first circuit and the second circuit are coupled to the pass-through circuit.

6. The power adaptor and storage unit of claim 1, wherein the power adaptor and storage unit comprises a plurality of operation phases, including a pure charging phase, a charging and converting phase, a pure converting phase, and a discharging phase.

7. The power adaptor and storage unit of claim 6, wherein during the pure charging phase, the power adaptor and storage unit is coupled to the external source, and wherein the input power is supplied to a battery, thereby charging the battery.

8. The power adaptor and storage unit of claim 6, wherein during the charging and converting phase, the power adaptor and storage unit is coupled to both the external source and the electronic device, and wherein the input power is supplied to a battery while the electronic device draws the input power from the power adaptor and storage unit.

9. The power adaptor and storage unit of claim 6, wherein during the pure converting phase, the power adaptor and storage unit is coupled to both the external source and the electronic device, and wherein the electronic device draws the input power directly from the source power through the adaptor and storage unit.

10. The power adaptor and storage unit of claim 6, wherein during the discharge phase, the power adaptor and storage unit is coupled to the electronic device, and wherein the electronic device draws power from the power adaptor and storage unit.

11. The power adaptor and storage unit of claim 1, wherein the power adaptor and storage unit is configured to electrically and removably couple to the electronic device.

12. The power adaptor and storage unit of claim 1, wherein the power adaptor and storage unit is configured to selectively operate using the input power, the storage circuit and the portable power module.

13. A power adaptor and storage unit for a portable device, comprising:
  a. a casing;
  b. a power converter unit disposed within the casing, the power converter unit configured to selectively receive power from an external source in a form unusable by the portable device and to simultaneously produce usable power and storable power therefrom;
  c. an energy storage unit disposed within the casing, the energy storage unit coupled to the power converter unit and configurable to receive the storable power therefrom and to store it as energy;
  d. a power pass-through unit disposed within the casing, the power pass-through unit coupled to the power converter unit and configurable to channel the usable power therethrough to the portable device;
  e. a power output unit disposed within the casing, the power output unit coupled to the energy storage unit and configurable to produce usable power from the energy within the energy storage unit and to supply it to the portable device; and
  f. a controller unit disposed within the casing, the controller unit configured to control the provision of storable power from the power converter unit to the energy storage unit, and to control the channeling of usable power through the power pass-through unit to the portable device, and to control the provision of energy from the energy storage unit through the power output unit to the portable device, wherein the controller unit is further configured to disable the power pass-through unit, disable the power output unit, and enable the energy storage unit when the power adaptor and storage unit is coupled to the external power source and the portable device is not coupled to the power adaptor and storage unit.

14. The power adaptor and storage unit of claim 13, wherein the energy storage unit comprises a battery and a charging circuit.

15. The power adaptor and storage unit of claim 5, wherein the power output unit comprises a discharging circuit.

16. The power adaptor and storage unit of claim 5, wherein the power output unit comprises a power converter.

17. A power adaptor and backup power unit for an electronic device, comprising:
  a. a body;
  b. a power converter disposed within the body, the power converter configured to selectively receive power unusable by the electronic device from an external supply and to produce converted power usable by the electronic device;
  c. an energy storage unit disposed within the body, the energy storage unit with an input coupled to the power converter through a first switching module and an output coupled a second switching module;
  d. a third switching module disposed within the body, the third switching module coupled to the power converter; and
  e. a controller disposed within the body, the controller coupled to the first, second and third switching modules, and configured to control the operation of the first, second, and third switching modules to optionally provide converted power from the power converter to an output of the power adaptor and backup power unit through one of the energy storage unit and the third switching module, and further configured to disable the second and third switching modules and enable the first switching module when the power convertor is coupled to the external supply and the electronic device is not coupled to the power adaptor and backup power unit.

18. A power adaptor and storage unit for a portable electronic device, comprising:
  a. a body;
  b. a power converter unit disposed within the body, the power converter unit configured to optionally receive power in a form unusable by the device from an external source and to produce a first usable power output and a storable power output from the received power when power is being received from the external source;
  c. a storage unit with an energy level and a total capacity disposed within the body, the storage unit configured to receive the storable power output from the power converter unit and store it as energy if the energy level is less than the total capacity;
  d. an output unit disposed within the body, the output unit configurable to receive energy from the storage unit and to produce a second usable power output from the received energy; and
  e. a controller disposed within the body, the controller configured to determine if the power converter is receiving power from the external source, and if it is not, to direct the output unit to produce the second usable power output and to supply the second usable power output to the portable device, and if the power convertor is receiving power from the external source, and the portable electronic device is not coupled to the power adaptor and storage unit, then the controller is further configured to disable the output unit.

19. The power adaptor and storage unit of claim 18, wherein the controller is configured to sense a charge level of a battery.

20. The power adaptor and storage unit of claim 18, wherein the power converter unit is removably coupled to the external source.

* * * * *

UNITED STATES PATENT AND TRADEMARK OFFICE
CERTIFICATE OF CORRECTION

PATENT NO. : 7,989,981 B2  
APPLICATION NO. : 11/701577  
DATED : August 2, 2011  
INVENTOR(S) : Zhang Page 1 of 1

It is certified that error appears in the above-identified patent and that said Letters Patent is hereby corrected as shown below:

In Claim 15 at column 11, line 39, the phrase "of claim 5," should read "of claim 13," so that the corresponding portion of the claim reads:
- The power adaptor and storage unit of claim 13, -

In Claim 16 at column 11, line 41, the phrase "of claim 5," should read "of claim 13," so that the corresponding portion of the claim reads:
- The power adaptor and storage unit of claim 13, -

Signed and Sealed this  
Twentieth Day of September, 2011

David J. Kappos  
*Director of the United States Patent and Trademark Office*